United States Patent
Brennan et al.

(10) Patent No.: US 11,048,554 B1
(45) Date of Patent: Jun. 29, 2021

(54) CORRELATED VOLUME PLACEMENT IN A DISTRIBUTED BLOCK STORAGE SERVICE

(71) Applicant: Amazon Technologies, Inc., Seattle, WA (US)

(72) Inventors: Patrick E. Brennan, Seattle, WA (US); Mitchell Flaherty, Seattle, WA (US); Christopher Magee Greenwood, Seattle, WA (US); Wells Lin, Bellevue, WA (US); Sriram Venugopal, Issaquah, WA (US); Linfeng Yu, Seattle, WA (US); Yilin Guo, Seattle, WA (US); Alexander R. Yee, Seattle, WA (US); Gary Michael Herndon, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 21 days.

(21) Appl. No.: 16/366,868

(22) Filed: Mar. 27, 2019

(51) Int. Cl.
*G06F 9/38* (2018.01)
*G06F 9/54* (2006.01)
*G06F 17/15* (2006.01)
*G06F 9/50* (2006.01)
*H04L 29/08* (2006.01)

(52) U.S. Cl.
CPC ........ *G06F 9/5016* (2013.01); *G06F 9/3885* (2013.01); *G06F 9/542* (2013.01); *G06F 17/15* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 7,519,734 | B1* | 4/2009 | Dumitriu | H04L 47/70 709/238 |
| 8,707,004 | B2* | 4/2014 | Hara | G06F 3/0605 711/170 |
| 9,053,167 | B1* | 6/2015 | Swift | G06F 16/27 |
| 9,826,041 | B1* | 11/2017 | Dhoolam | G06F 3/0689 |
| 9,965,381 | B1* | 5/2018 | Sahin | G06F 3/0605 |
| 9,971,548 | B1* | 5/2018 | Talwar | G06F 3/0647 |
| 9,983,795 | B1* | 5/2018 | Naamad | G06F 3/0629 |
| 10,193,821 | B1* | 1/2019 | Greenwood | H04L 41/0896 |
| 10,353,634 | B1* | 7/2019 | Greenwood | G06F 3/0619 |
| 10,616,134 | B1* | 4/2020 | Greenwood | H04L 47/783 |
| 10,742,567 | B2* | 8/2020 | Srinivasan | H04L 67/1097 |
| 2006/0271547 | A1* | 11/2006 | Chen | G06F 16/1844 |

(Continued)

*Primary Examiner* — Isaac T Tecklu
(74) *Attorney, Agent, or Firm* — Knobbe, Martens, Olson & Bear, LLP

(57) ABSTRACT

Systems and methods are disclosed for handling requests to create multiple volumes with an expected usage correlation on a block storage service. Rather than handling each request to create a volume independently, embodiments described herein can handle the request in bulk. In one embodiment, the service allows for oversubscription of use on hosts, as well as parallelization of placement decisions, by distributing requests among a set of parallelized placement engines. Each engine can distribute its subset of volumes at least partly randomly among a candidate set of volumes, with the size of the candidate set selected based on a total number of volumes. This distribution mechanism can ensure distribution of volumes without requiring centralized placement of the volumes.

20 Claims, 7 Drawing Sheets

(56) References Cited

U.S. PATENT DOCUMENTS

| | | | |
|---|---|---|---|
| 2007/0245082 A1* | 10/2007 | Margolus | G06F 11/1096 711/114 |
| 2008/0295094 A1* | 11/2008 | Korupolu | G06F 9/5066 718/1 |
| 2012/0036515 A1 | 2/2012 | Heim | |
| 2012/0316846 A1* | 12/2012 | Cohen | G11B 27/002 703/2 |
| 2012/0331249 A1* | 12/2012 | Benjamin | G06F 3/0607 711/162 |
| 2013/0111468 A1 | 5/2013 | Davis et al. | |
| 2014/0019961 A1* | 1/2014 | Neuse | G06F 9/5077 718/1 |
| 2014/0351545 A1* | 11/2014 | Nakajima | G06F 3/067 711/170 |
| 2014/0359243 A1* | 12/2014 | Byrd | G06F 11/34 711/170 |
| 2014/0359244 A1* | 12/2014 | Chambliss | G06F 3/0604 711/170 |
| 2014/0380303 A1* | 12/2014 | Bello | G06F 3/0604 718/1 |
| 2016/0299711 A1* | 10/2016 | Bolik | G06F 3/0665 |
| 2016/0358076 A1* | 12/2016 | Lord | G06N 7/005 |
| 2018/0067881 A1* | 3/2018 | Frandzel | G06F 13/1642 |
| 2018/0232249 A1 | 8/2018 | Keohane et al. | |
| 2020/0174695 A1* | 6/2020 | Bazarsky | G06F 3/061 |

\* cited by examiner

CORRELATED VOLUME PLACEMENT IN A DISTRIBUTED BLOCK STORAGE SERVICE

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, various different placement optimizations and/or constraints may be implemented in order to provide performance guarantees. When placing block-based storage resources amongst resource hosts, selecting from among different placement options that satisfy the optimizations and/or constraints to place storage may prove challenging.

DETAILED DESCRIPTION

Figure 1:
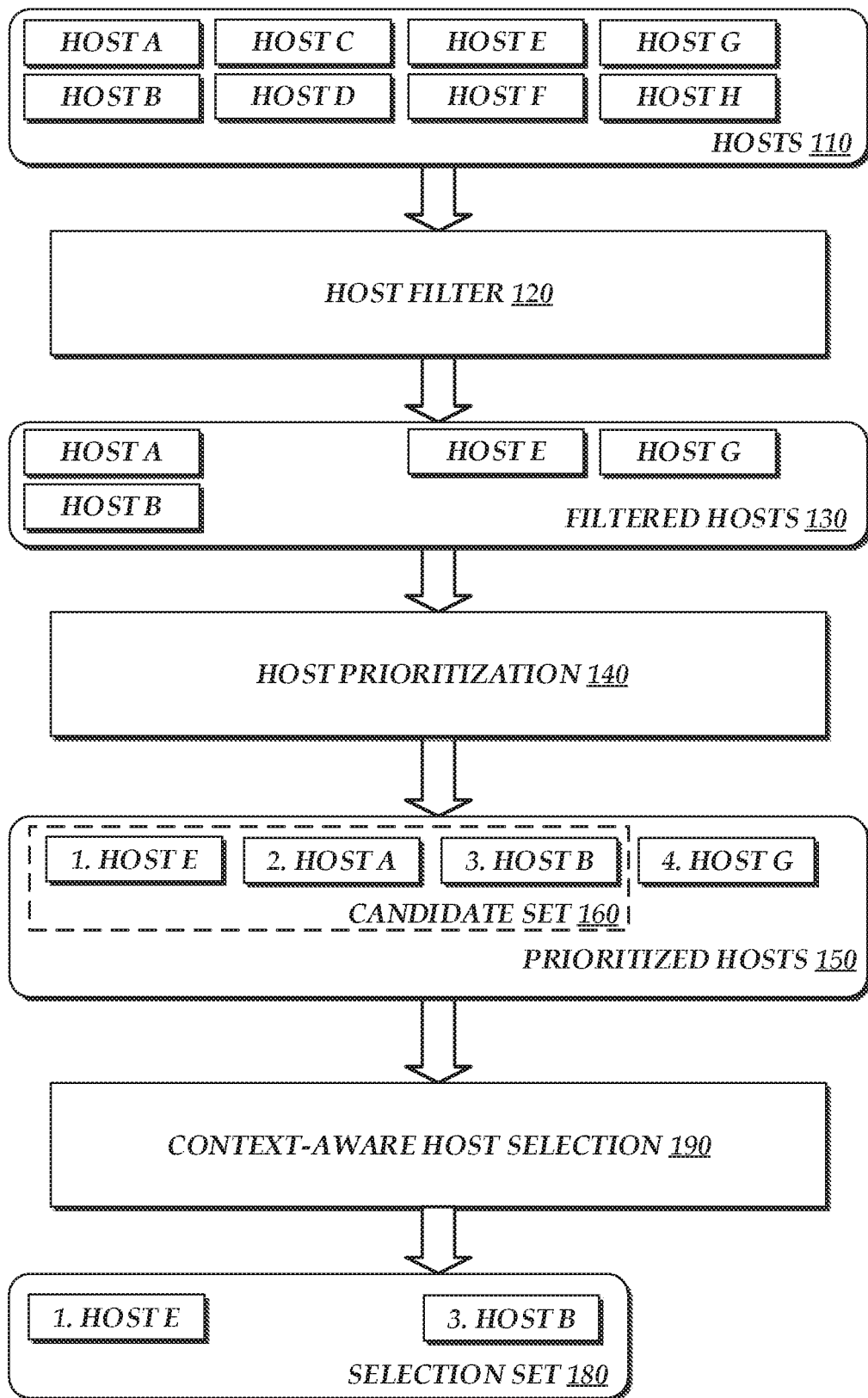
FIG. 1 illustrates a logical block diagram for an illustrative context-aware host placement algorithm.

Generally described, aspects of the present disclosure related to context-aware placement of storage volumes on a network-based block storage service. The block storage service may provide to end users of the service network-based access to block storage volumes, readable and writable by computing devices at a block level (as opposed, for example, to object storage services enabling reading and writing of data object). The block storage service may be configured for rapid configuration of block storage volumes, such that a client may request on-demand creation of a block storage volumes for use by a computing system of the end user. For example, a client may be associated with a virtual machine instance on a hosted computing environment (sometimes known as a cloud computing environment) and request from the block storage service storage volume for use by that instance. The service may utilize a placement algorithm to locate available storage within the service, and allocate that storage for use by the instance. Thus, the client may be able to rapidly configure storage volumes for computing devices.

More specifically, aspects of the present disclosure relate to handling multiple interrelated requests for storage volumes on a block storage service. Due to their rapid scalability, hosted computing devices are sometimes used to generate on-demand computing clusters, including hundreds or thousands of devices. Such clusters may be used, for example, to conduct parallel processing on very large data sets (e.g., terabytes, petabytes, etc.). For example, a client may request the creation of 10,000 virtual machine instances to conduct a machine learning application. The client may provide a machine image containing an operating system and runtime environment for conducting machine learning, and submit a request to the block storage service to generate 10,000 network-accessible block storage volumes (e.g., as a virtual hard disk drive for each instance), each provisioned with the machine image. The client may then boot the instances based on the data within the block storage volumes to conduct a machine learning application.

One approach to handling such a request would be to treat each request for a block storage device individually. For example, as disclosed in U.S. patent application Ser. No. 14/661,627, entitled "Prioritizing Resource Hosts for Resource Placement" and filed Mar. 18, 2015, (the "'627 Application"), the entirety of which is hereby incorporated by reference, a block storage service may receive a request to create a block storage volume, determine an appropriate host device on which to place the volume, and create the volume on the host device. Treating requests individually has an advantage of simplicity, and may function well in many use cases. However, in instances where a large number of interrelated volumes is requested (e.g., hundreds or thousands), individual treatment may lead to undesirable results. For example, less than all requests may succeed, causing a deployment of the volumes to at least partially (and potentially completely) fail.

Moreover, treating requests individually may cause the block storage system to make placement decisions that appear acceptable or even optimal on an individual level, but that are unacceptable in view of the interrelated nature of multiple requests. Consider an instance in which a block storage service "oversubscribes" host devices in at least one respect, to efficiently optimize resource usage. For example, the service may ensure that a host device has sufficient storage capacity to provide storage volumes to multiple client devices at a single time, but not necessarily ensure that the host device has sufficient network bandwidth to support a maximum read/write speed to each storage volume simultaneously. Rather, the service may operate on the assumption that reads and writes to the various hosted volumes are not perfectly correlated, such that when one storage volume is being written to, another is not, etc. This oversubscription model may vastly improve the efficiency of the service relative to attempting to reserve sufficient resources to fully utilize every block storage volume simultaneously. However, in the instance of interrelated requests, a combination of individual request treatment and oversubscription techniques can lead to undesirable results. For example, consider an instance in which a majority of host devices within a block storage service are operating near their capacity, and the service is reconfigured to add a set of new host devices to expand that capacity. If a request for 1,000 new volumes were received, the block storage service may attempt to place each new volume onto the set of new host devices according to its typical oversubscription constraints. For example, 100 new volumes may be placed onto each of 10 new host devices. However, where these 1,000 new volumes are used for cluster computing, input and output to the volumes may be strongly correlated, such that either all volumes are in use at a given instance or all volumes are not. This may cause the oversubscription model to fail, as the assumption of non-correlated volume usage is not satisfied.

The present disclosure addresses the above problems by providing for context-aware placement of storage volumes within a block storage service. Specifically, rather than handling requests at an individual level, embodiments of the present disclosure can handle interrelated requests based on contextual information related to the requests, such as a number of volumes simultaneously requested for creation. The block storage service can thus, for example, quickly notify a client if the requests as a set will fail, rather than treating each request individually and detecting a failure partway through handling the set. The block storage service can further make placement decisions regarding a set of requests with knowledge that the set exists, enabling the service to, for example, spread volumes across multiple host devices, preserving the assumption of non-correlated usage and thus preserving the ability to oversubscribe devices with respect to one or more computing resources.

One difficulty in handling correlated sets of volume requests can stem from use of distributed systems within a block storage service. Distributed systems are common within hosted computing environments, since such systems distribute points of failure, such that any individual failure is unlikely to halt the service as a whole. A known issue in distributed systems is the difficulty of maintaining accurate distributed knowledge with respect to dynamic information. For example, in distributed databases, it may be difficult to ensure that all devices agree on the content of a specific database record, where that content is frequently being altered. In the context of placement within a distributed block storage service, placement of volumes among host devices may be handled by a distributed set of placement engines, each of which may operate to select a host device on which to place a volume. Because responsibility for determining a configuration of host devices is distributed, no individual placement engine can be expected to have perfect knowledge of that configuration at any given time. (That is, even if an engine obtains knowledge of a current configuration at a given time, by the time that information is obtained at the engine and acted on, that configuration could have been changed by another engine.)

In the context of correlated volume requests, distributed placement (and the lack of perfect knowledge typical of distributed systems) can lead to difficulties in placing volumes, or even an inability to place volumes into devices that would objectively be optimal. For example, consider a case in which a client requests 100 volumes be allocated for a cluster analysis application. The request may be distributed to 10 placement engines, each attempting to locate host devices for 10 volumes. Assume each host began with the same view of a current configuration of host devices in the block storage system, and applied a selection algorithm to locate host devices for its 10 volumes. Even assuming the placement engine selected based on contextual knowledge that 10 volumes were being requested, it is possible or even likely that each of the 10 engines would select the same 10 host devices to host their 10 volumes (as each began with an identical view of the configuration of the service). This would lead to undesirable co-location of correlated volumes (e.g., due to the oversubscription assumptions noted above).

Some embodiments of the present disclosure address these issues by configuring distributed placement engines to inject randomness into placement decisions. For example, where 10 placement engines are tasked with placing 10 volumes in a set of 100 correlated volumes, each engine may select 100 "candidate" host devices that are capable of hosting each volume, and randomly select from those candidate host devices 10 devices onto which to place its assigned volumes. By applying random selection at each placement engine, the "blast radius" of correlated volumes can be increased, reducing the probability that a large number of volumes are placed onto a single host and that oversubscription assumptions are violated.

As would be appreciated by one of skill in the art, the embodiments described herein represents a significant technological advance over prior implementations. Specifically, the application of contextual information regarding interrelated volume requests at a placement engine of a block storage services enables the engine to more efficiently place volumes within host devices, maintaining an ability of the service to oversubscribe volumes and thus reducing computing resource usage of the service overall. Moreover, as would be recognized by one skilled in the art, the embodiments described herein (e.g., the specific use of contextual information at a placement engine regarding interrelated volume requests) provide a technical solution to technical problems within the field of network-based block storage services, such as the need to efficiently distribute load among a service and the inability of maintaining perfect information within distributed systems (particularly while rapidly responding to client requests). As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, while embodiments are disclosed herein with reference to placing volumes within a block-storage service, the techniques described herein may be applied to a variety of network-based resources. For example, context-aware placement as discussed herein may be applied to the distribution of requested virtual machine instances in a hosted virtual machine service. While embodiments are described herein with respect to distribution of volumes among a given number of host devices, distributions may additionally or alternatively be based on computing resources available for such devices. For example, a single host device may be assumed in a given instance to support a certain number of input/output operations per second ("IOPS"), and thus correlated volumes may be distributed among multiple host devices in an attempt to ensure that correlated use of the volumes does not exceed the IOPS capacity of any single host. However, in some configurations a host may vary in its ability to handle IOPS. For example, a host with more processing power (in either absolute or currently available terms) may be able to handle more IOPS, such that the host is considered to function as would two standard hosts. Thus, rather than distribute volumes among hosts, embodiments as described herein may distribute volumes among IOPS "units," with each unit representing computational capacity to handle IOPS expected to occur with respect to a single volume in a correlated set (where expected IOPS may be based, for example, on an advertised performance of a volume, historical data regarding similar volumes, etc.). For example, volumes may be distributed among four host devices each representing one IOPS unit or two host devices each representing two IOPS units, or may be co-hosted in one host device representing four IOPS units. In this way, the algorithms disclosed herein may be modified to address varying compute resources available at hosts. Somewhat similarly, while embodiments are discussed herein related to varying a candidate set of devices among which volumes are placed based on a total number of correlated volumes requested, some embodiments may additionally or alternatively vary a candidate set size based on other metrics related to the requested volumes in aggregate. For example, a candidate set size may be modified based on a total expected IOPS across a set of correlated volumes or a total bandwidth usage across the set of correlated volumes.

As used herein, correlated volumes may be expected (or observed) to have corresponding I/O patterns. Moreover, while embodiments are discussed herein with reference to correlated I/O to volumes, volumes may additionally or alternatively be correlated in other ways. For example, two volumes co-hosted on a given device may be correlated with respect to failure, since a failure of that device is likely to affect both volumes, whereas two volumes hosted on separate devices are not correlated with respect to reliability. It may be acceptable that two unrelated volumes (e.g., of different clients) have correlated failures, since each client may also have access to a separate replica of the volume on another device. However, it may be unacceptable that two volumes of the same client have correlated failures, as an individual failure may have a substantial impact on the client's experience. In addition to distributing volumes based on assumed correlation of I/O, embodiments described herein can address this issue, by distributing volumes based on assumed reliability correlation. Thus, the examples and embodiments discussed herein are intended to be illustrative in nature.

FIG. 1 illustrates a logical block diagram for context-aware placement of multiple interrelated volumes among a set of resource hosts. Each volume may correspond to a logical block-storage device hosted by a block storage service and made available over a network to another computing device, such as a virtual machine instance. Volumes may be interrelated, for example, by being requested for creation within a single request. For example, a request to create 10,000 volumes may result in the service attempting to place 10,000 interrelated volumes. Volumes may further be interrelated by being requested for attachment to a computing device within a defined cluster of computing devices. For example, a request to add a new virtual machine instance to an existing cluster, and to create a new volume for that instance, may cause the new volume to be considered interrelated by the block storage service to other volumes attached to instances within the cluster. Interrelated volumes may also be referred to herein as correlated volumes, as embodiments of the present disclosure may operate on an assumption that use of interrelated volumes may be correlated in at least one aspect.

The hosts among which volumes are placed may each correspond to a physical computing device, such as a server or other computing system (e.g., computing system 1000 in FIG. 7 below) which may be utilized to host, store, or otherwise implement a resource, such as a network-accessible block storage volume. Hosts may be differently configured, differently utilized, and/or differently located with respect to one another.

For placing volumes at hosts, some hosts may be more preferable than others. Thus, a host selection algorithm may be implemented for placement of correlated volumes to ensure that the volumes can be placed with the service in an acceptable manner, and to attempt to best place the volumes among hosts. The host selection algorithm is visually illustrated in FIG. 1.

As illustrated in FIG. 1, a block storage service may include a variety of hosts 110, depicted in FIG. 1 as Hosts A-H. At a first stage of the host selection algorithm, the service may filter according to a host filter 120. Various filter constraints may be implemented to remove hosts upon which volumes within a correlated set of volumes may not be placed. For example, placement constraints, such as requirements for specific hardware (e.g., solid state storage drives) or software (e.g., particular operating systems or application software), location requirements (e.g., locating a resource in particular location (or not in a particular location) in order to implement some placement diversity requirement with respect to other volumes), performance requirements (e.g., a certain size or amount of storage or a certain amount of available input/output operations per second (IOPS)) or explicitly identified host unavailable for hosting volumes (e.g., a blacklist of off limit hosts) may be applied to remove some resource hosts from evaluation, leaving available hosts 130 for placement consideration. For example, in FIG. 1, Hosts C, D, F, and H may be determined to be unavailable for placing individual volumes within a correlated set.

At a second stage of the host selection process, the service may conduct a prioritization of filtered hosts 130. Prioritization may generally arrange the filtered hosts 130 according to a desirability of hosting a volume of the correlated set on each individual host. The desirability may be based, for example, on available compute resources of a host, such as available storage space (e.g., in various types of physical storage), availability to handle input/output operations, available network bandwidth, and the like. As a result of prioritization, filtered hosts 130 may be sorted into prioritized hosts 150. For example, as shown in FIG. 1, Host E may be selected as most preferable among the prioritized hosts 150 to host a volume within a correlated set, while Host G is selected as least preferable to (though still capable of) hosting a volume.

After generating a listing of prioritized hosts 150, the hosts 150 are passed through context-aware host selection 190 at stage 3 of the host selection algorithm. The selection 190 may generally attempt to distribute correlated volumes among the block storage service, in a manner that does not require perfect knowledge of a state of the service and that does not inhibit parallelization of the host selection algorithm. Illustratively, the selection algorithm of FIG. 1 may be implemented with respect to 10 volumes requested within a 100 volume correlated set. Each prioritized host 150 may have capacity to host at least one, and potentially multiples of the 10 volumes. One approach to placement may be to load balance the volumes among the prioritized hosts 150 based on available resources of the hosts 150. Thus, if one of the hosts 150 had large amounts of available compute resources (e.g., the host device was newly added to the block storage service), and each volume was assumed to consume a fixed amount of such resources on average. A naive approach may be to place volumes onto that one host until the expected resource consumption of the host equaled the expected average consumption among all hosts. However, because load on interrelated volumes may be expected to be correlated, the actual load on the host during peak usage under this scenario could far exceed the expected resource consumption of the volumes when viewed as individual averages. Thus, rather than "pack" volumes onto a host with maximal resources, the context-aware host selection 190 may attempt to spread correlated volumes among a candidate set 160. In one embodiment, a size of the candidate set 160 is selected based on a total number of volumes within a correlated set. For example, where a total of 100 volumes is requested, the candidate set may be selected as 100 host devices in an effort to place no more than 1 volume on each host, on average. In some embodiments, the candidate set may be selected to be larger than the requested volumes in an effort to place less than 1 volume on each host. In other embodiments, the candidate set may be selected to be smaller than the requested volumes (e.g., where it is acceptable to place more than 1 volume on each host on average). Illustratively, a size of the candidate set may be set as a percentage of the number of requested volumes (e.g., the size of the candidate set is equal to the number of requested volumes multiplied by a sizing factor, which factor may be, for example, between 0.5 and 2).

In one embodiment, a placement engine may only be aware of volumes that it itself is attempting to place. Thus, if a placement engine is attempting to place 10 correlated volumes, the placement engine may use 10 as the number of requested volumes in the equations discussed above. However, under this scenario, parallelization of the placement algorithm may lead to undesirable results. For example, assume a request is received for a total of 100 correlated volumes, and 10 placement engines each conduct the algorithm depicted in FIG. 1 with respect to 10 volumes. Further assume that each engine obtains the same prioritization of hosts, and sets a candidate set size equal to the number of volumes that individual engine is assigned to handle (i.e., a size of 10). In this scenario, undesirable packing of hosts may occur, since while each engine may distribute an average of one volume per host within the candidate set, the 10 engines in parallel would distribute an average of 10 volumes per host.

To address this issue, each placement engine in another embodiment may be provided with context of an entire request, and use a total number of requested volumes as the number of requested volumes in the equations discussed above. For example, in the scenario above (where 100 volumes are requested, and that request is distributed among 10 engines), each engine may select 100 candidate hosts, and distribute their 10 volumes among those 100 hosts. This would result in an average of 1 volume per host, resolving any issues of packing that might occur due to parallelization.

In addition to a number of requested interrelated volumes, a placement engine may vary a size of a candidate set according to other criteria. Illustratively, the size of a candidate set may vary according to the performance expectations of the interrelated volumes. Where a client requests volumes of relatively low performance, the candidate set size may be decreased (resulting in tighter "packing" of volumes). Where a client requests volumes of relatively high performance, the candidate set size may be increased (resulting in less "packing" of volumes). As a further illustration, a size of a candidate set may in one embodiment vary according to an expected "staleness" of knowledge of a placement engine—that is, the reliability of an engine's knowledge of a configuration of the block storage service. The reliability of an engines knowledge may be based, for example, on a length of time since new information regarding the configuration was received (with longer times decreasing reliability) as well as an expected volatility of the system (with higher volatility also decreasing reliability). In one embodiment, volatility is measured based at least partly on requests to a placement engine. That is, if a given placement engine is currently handling a high number of placement requests, it is likely that other engines are also handling a high number of requests, and the configuration of the service can be expected to be volatile. The size of a candidate set may illustratively be increased as the staleness of knowledge of a placement engine increases, to provide greater distribution of volumes and avoid undesirable volume packing.

In some embodiments, candidate set size may be additionally or alternatively selected based on a relative desirability of placing a volume on a host. For example, where each host within prioritized hosts 150 is assigned a priority score, and the distribution of priority scores is relatively flat, the candidate set size may be increased to encompass more hosts (as there is little difference in desirability between placing a volume on the nth priority host as compared to the (n+1)th priority host). Conversely, where a distribution of scores shows a steep decline in priority, the candidate set size may be decreased. For example, once an initial candidate set size is selected, an initial candidate set 160 of that size may be increased to include any additional hosts from the prioritized hosts 150 with a priority score within a threshold distance of a lowest-scored host in the initial candidate set 160.

Embodiments above generally describe selection of a size for the candidate set 160 based on a single implementation of the algorithm of FIG. 1, such that the algorithm may be independently implemented (e.g., in parallel across multiple devices). In some embodiments, the algorithm may additionally or alternatively be modified to utilize contextual information regarding parallel implementations of the algorithm. For example, a placement engine implementing the algorithm may be informed of both a total number of correlated volumes to be placed, and the relative position in that total number of the volumes of which the engine is assigned to handle placement (e.g., an engine may be notified that it is handling placement of volumes 20-29 of a request for 100 volumes). The placement engine may modify the algorithm of FIG. 1 based on this information, such as by modified the candidate set size based on the relative position of the volumes to-be-placed by the engine in the overall request. For example, the candidate set size may be decreased for earlier-positioned volumes (such that the volumes are more likely to be placed in desirable locations) and increased for later-positioned volumes (to achieve the desired distribution of volumes.

Moreover, in some instances, the algorithm may also occur at least partially iteratively. For example, consider a request to place 1,000 volumes, distributed among 10 placement engines. Rather than create a purely parallelized request that each engine place 100 volumes, a system may request that each of the 10 placement engines place 50 volumes in a "first pass" attempt to satisfy the request, and then request that each of the 10 engines place 50 volumes in a "second pass" of the request. This combination of parallel and iterative placement may be particularly useful for requests that are very large relative to a capacity of a placement engine to make rapid placement decisions. In instances where distributed placement occurs at least partially iteratively, later implementations of the algorithm may be modified based on decisions made during prior implementations. For example, an engine conducting a second implementation may be notified of hosts included within a selection set 180 of a first implementation, and the engine may remove those hosts from the candidate set 160 for the second implementation, or deprioritize those hosts in the candidate set 160.

Returning to FIG. 1, after selecting a size of a candidate set 160, the placement engine selects one or more hosts from the set 160 to host volumes within the correlated set, resulting in selection set 180. For example, in FIG. 1, a placement algorithm may be applied to select hosts for two correlated volumes, resulting in Host E and Host B being selected from among the three hosts in the candidate set 160. In one embodiment, a placement engine may be randomly selected from the candidate set 160 for each volume to be placed. Thus, to place two volumes, an engine may randomly select two hosts from the set 160. Random selection may include, for example, random selection without replacement (such that a host selected in a first random selection is not considered for a second) or random selection with replacement (such that each host within the candidate set 160 is considered in each random selection). In some instances, a placement engine may conduct a weighted random selection, such as by weighting each host based on their relative priority within the candidate set 160. As a result, volumes handled by a placement engine can be expected to be distributed among the candidate set 160. Because the candidate set can be sized according to a total number of correlated volumes, a probabilistically favorable distribution can be achieved even among distributed placement engines operating without perfect knowledge of a configuration of the block storage service.

In some instances, a client may request a number of correlated volumes that the block storage service is unable to handle. For example, the service may have capacity to handle 1,000 volumes, and a client may request 1,100 volumes. As another example, the service may have capacity to handle 1,000 uncorrelated volumes, but a client may request 1,000 volumes that are expected to be correlated. The algorithm of FIG. 1 may be implemented to provide rapid determination of these instances, such that a client is quickly notified that the service cannot fulfill a request (e.g., before the service attempts and fails to fulfill the request). For example, a placement engine may prior to implementing the host filter 120, determine a size of the candidate set 160 from which the selection set 180 will be selected. At each stage of the algorithm, the placement engine may compare a current set of hosts to that size, to determine whether the block storage service can potentially satisfy the request. For example, if the candidate size for 1,000 volumes is 1,000, the engine may determine whether 1,000 hosts 110 exist on the service. If not, the engine may reject the placement request. If 1,000 hosts 110 exist but less than 1,000 filtered hosts 130 exist, the engine may similarly reject the placement request. Thus, a client may be notified relatively rapidly of whether the service can fulfill a request.

In some instances, a client notified of a rejected request may be notified of a number of correlated volumes that the block storage service could fulfill. To determine this number, a placement engine may first determine a number of filtered host 130 for the request, and assume a candidate set size equal to the number of filtered hosts 130. The engine may then determine a number of correlated volumes corresponding to that candidate size, which number is can represent a maximum number of volumes that the service may host. For example, where a candidate set is selected as twice as large as a total number of requested correlated volumes, and filtered hosts 130 includes 1,000 hosts, the engine may determine that no more than 500 correlated volumes can be placed into the service. The engine may then notify a control plane, which in turn notifies the client of this number. The client may then, for example, modify their request to attempt placement of volumes on the service. It may be noted that because a size of a candidate set can be determined based on a total number of requested volumes, parallel placement engines can be expected to arrive at the same maximum number of correlated volumes that can be placed, assuming those engines share common knowledge of a configuration of the block storage service. In the instance that common knowledge does not exist (and thus engines arrive at different maximum numbers), the control plane (or other intermediary device) may apply conflict resolution to the different maximum numbers to arrive at a resultant number. The resolution may, for example, select a lowest maximum number to use for a notification to a client.

The remaining description begins with a general description of a provider network, which may implement prioritizing hosts for volume placement offered via one or more network-based block storage services in the provider network. Then various examples of a block-based storage service are discussed, including different components/modules, or arrangements of components/module that may be employed as part of volume placement for data volumes in the block-based storage service. A number of different methods and techniques to implement prioritizing resource hosts for resource placement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
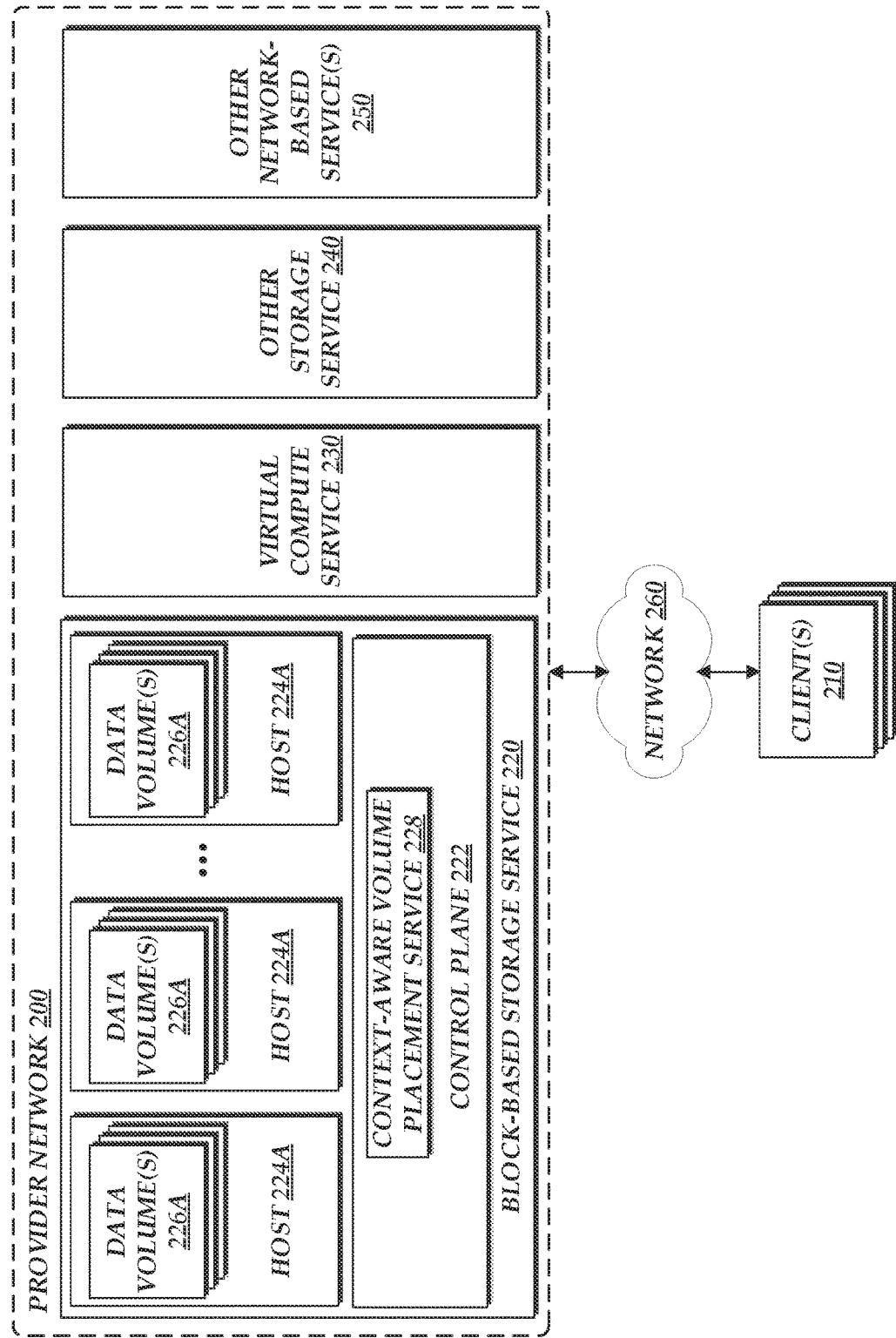
FIG. 2 is a block diagram depicting an illustrative provider network that includes multiple network-based services such as a block-based storage service that implements the context-aware host placement algorithm of FIG. 1, according to some embodiments.

FIG. 2 is a block diagram illustrating a provider network 200 that includes multiple network-based services such as a block-based storage service 220 that implements context-aware placement of correlated volumes, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise, network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, JAVA™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent hosts 224a, 224b, 224c through 224n (e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing network-accessible block storage (e.g., as virtualized hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a host 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane 222 may implement a context-aware volume placement service 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
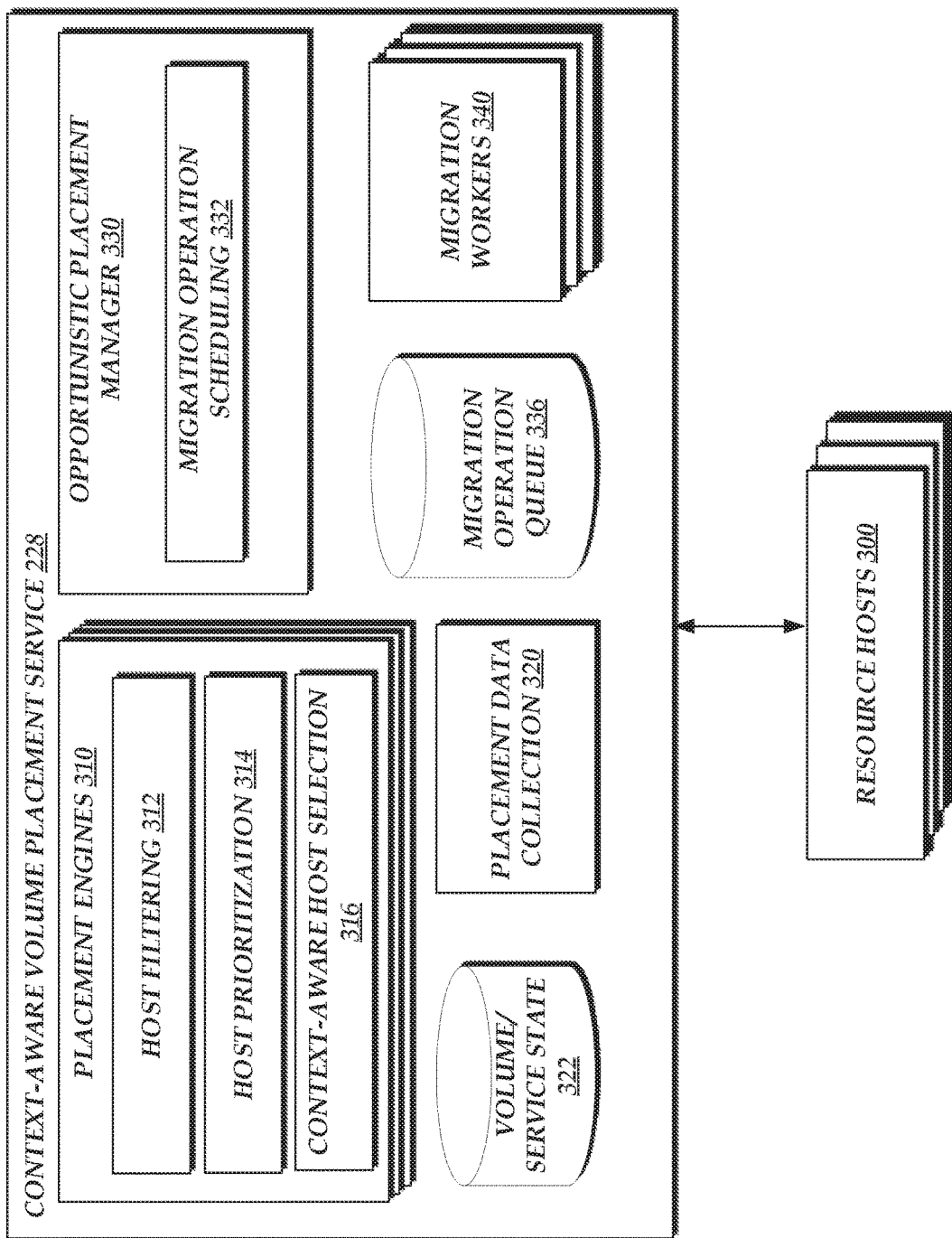
FIG. 3 is a logical block diagram depicting an illustrative context-aware volume placement service within block-based storage service of FIG. 2, which the storage service may utilize to implement the context-aware host placement algorithm of FIG. 1.

FIG. 3 is a logical block diagram illustrating a context-aware volume placement service 228 that implements context-aware volume placement in accordance with embodiments of the present disclosure. As noted above, multiple hosts, such as hosts 300, may be implemented in order to provide block-based storage services. A resource host 300 may be one or more computing systems or devices, such as a storage server or other computing system (e.g., computing system 1000 described below with regard to FIG. 7). Each host may maintain respective data volumes, or replicas of data volumes (e.g., in instances where a data volume is divided into duplicate volumes, each referred to herein as a "replica"). Some data volumes may differ in size from other data volumes, in some embodiments. Hosts 300 may also provide multi-tenant storage. For example, in some embodiments, one host may maintain a data volume for one account of block-based storage service 220, while another data volume maintained at the same host may be maintained for a different account. Hosts 300 may persist their respective data volumes in one or more block-based storage devices (e.g., hard disk drives, solid state drives, flash memory devices, etc.) that may be directly attached to a computing system or device implementing the respective resource host. Resource hosts 300 may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more hosts as a distributed volume maintaining a same replica of a data volume at the different hosts. For example, different types of mirroring and/or replication techniques may be implemented (e.g., RAID 1) to increase the durability of a data volume, such as by eliminating a single point of failure for a data volume. In order to provide access to a data volume, hosts may then coordinate I/O requests, such as write requests, among the two or more hosts maintaining a replica of a data volume. For example, for a given data volume, one host may serve as a master host. A master host may, in various embodiments, receive and process requests (e.g., I/O requests) from clients of the data volume. Thus, the master host may then coordinate replication of I/O requests, such as write requests, or any other changes or modifications to the data volume to one or more other hosts serving as slave hosts. Thus, when a write request is received for the data volume at a master host, the master host may forward the write request to the slave host(s) and wait until the slave host(s) acknowledges the write request as complete before completing the write request at the master host. Master hosts may direct other operations for data volumes, like snapshot operations or other I/O operations (e.g., serving a read request).

In some embodiments, the role of master and slave hosts may be assigned per data volume. For example, for a data volume maintained at one host, the host may serve as a master resource host. While for another data volume maintained at the same host, the host may serve as a slave resource host. Hosts may implement respective I/O managers. The I/O managers may handle I/O requests directed toward data volumes maintained at a particular host. Thus, I/O managers may process and handle a write request to volume at host, for example. I/O managers may be configured to process I/O requests according to block-based storage service application programming interface (API) and/or other communication protocols, such as such as internet small computer system interface (iSCSI).

Hosts may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a host (and replicas of data volumes implemented on the host) may be within multiple different types of infrastructure zones, such as a particular network router or brick, a particular room location, a particular site, etc.

Block-based storage service control plane 222 may implement a context-aware volume placement service 228, in various embodiments. The context-aware volume placement service 228 may be implemented at one or more computing nodes, systems, or devices (e.g., system 1000 in FIG. 7). In at least some embodiments, the context-aware volume placement service 228 may implement placement data collection 320 to collect information, metrics, metadata, or any other information for performing volume placement. Placement data collection 320 may periodically sweep host(s) 300 with a query for the information, metrics, or metadata. For example, hosts may provide current utilization metrics, ongoing tasks or operations (e.g., such as migration or remirror tasks), and any other state information for the host, including volume specific information for volumes residing at the hosts. In some embodiments, placement data collection 320 may aggregate the data according to infrastructure zones, partitions, hosts, or other granularities for block-based storage service 220. Placement data collection 320 may store the data at volume/service state store 322, which may persistently maintain the collected data. In some embodiments, volume/service state store 322 may be implemented as a database or otherwise searchable/query-able storage system to provide access to other components of volume placement 228 or block-based storage service control plane 222. Due to the nature of distributed systems, it is to be expected that the volume/service state store 322 could contain imperfect data. For example, where placement data collection 320 operates to collect data every 10 seconds, the store 322 can be expected to contain, on average, data that is 5 seconds out of date. Given the rapid nature of block storage service 220, this staleness may result in imperfect decision making by the service 228, which is addressed by the embodiments discussed herein.

The context-aware volume placement service 228 illustratively implements multiple placement engines 310, in various embodiments. Each placement engine 310 may correspond to a computing device configured to receive a request to place one or more volumes among hosts 300, and to select hosts 300 onto which to place the volumes according to a placement selection algorithm. In accordance with embodiments of the present disclosure, the placement selection algorithm may take into account the context of a placement request, such as how many interrelated volumes are associated with the placement request. The placements engines 310 may each attempt to locate acceptable placement of their respective volumes, given the potential for interrelated volumes to have correlated resource usage and given an assumption that the placement engine 310 has imperfect knowledge of a state of the hosts 300.

Specifically, the placement selection algorithm implemented by placement engines 310 can include implementing host filtering 312. As discussed above with regard to FIG. 1, host filtering may remove from evaluated hosts for a volume those resource hosts which do not satisfy placement constraints for the volume. For example, placement constraints may include hosts located outside of specified logical or physical localities (e.g., specified server pools, specified locations with respect other resources, such as implementing server rack diversity between master and slave replicas of a data volume), hosts with insufficient capacity to host the volume (e.g., insufficient processing, storage, and/or network capability to host the resource), and/or blacklisted or otherwise explicitly excluded hosts (e.g., a list of unavailable network addresses).

The placement selection algorithm implemented by placement engines 310 can further include implementing host prioritization 314. As discussed above with regard to FIG. 1, host prioritization may order hosts according to a desirability of hosting a volume on the host, such as based on a configuration of the host (e.g., availability and suitability of specific hardware) and current load on the host (e.g., currently hosted volumes, usage of those volumes, etc.) For example, host prioritization may apply a priority scheme to hosts, evaluating the hosts according to the priority scheme and assigning each host a given priority. The priority scheme may be based, for example, on a hardware configuration of a host, utilization (e.g., current, historical, or predicted) of one or more compute resources of the host (e.g., data storage, working memory, processor utilization, bandwidth, etc.), network distance between a host and a relevant other resource (e.g., a client device, a data source, such as another data volume or an object in a block storage service, etc.), and the like. Example mechanisms for prioritizing hosts are provided in U.S. patent application Ser. No. 14/643,479, entitled "Evaluating Placement Configurations for Distributed Resource Placement" and file Mar. 10, 2015 (the "'479 Application"), as well as U.S. patent application Ser. No. 15/078,856, entitled "Bit Vector Analysis for Resource Placement in a Distributed System" and filed Mar. 23, 2016 (the "'856 Application"), the entireties of which are hereby incorporated by reference herein.

After generating a prioritized listing of available hosts, placement engines 310 can apply context-aware host selection 316 to the listing to select hosts onto which to place the correlated volumes. As discussed above, context-aware host selection can include selecting a candidate set from the prioritized listing, with a size of the candidate set based at least partly on a number of interrelated volumes requested (e.g., as a proportion of the number of volumes). The size of the candidate set may further be based on desired characteristics, such as speed, of the volumes requested. Still further, the size of the candidate set may be based on the reliability of the information available at an individual placement engine 310 (e.g., as indicated by a staleness of the volume/service state data in the store 322, a volume of placement requests at the engine 310, etc.). After selecting a candidate set from the prioritized listing, context-aware host selection 316 can include distributing volumes among hosts within the candidate set. In one embodiment, selection of a host for each volume is based on random selection, either with or without replacement. In another embodiment, selection of a host for each volume is based on a random weighted selection.

In addition to placement engines 310, the context-aware volume placement service 228 may further implement one or more opportunistic placement managers 330. Opportunistic placement manager 330 may dynamically or proactively migrate currently placed resources (e.g., volume replicas) from one resource host to another resource host so that the placement for the resource (e.g., data volume) is more optimal and/or placement of resources amongst the resource host(s) 300 is more optimal as a whole (even if the migration results in a same or less optimal new placement for the migrated resource). For example, opportunistic placement manager 330 may implement migration operation scheduling 332 to request placements for resources from placement engine 310 that are determined to be placed sub-optimally. Migration operation scheduling 332 may then determine which placements if performed would exceed a migration optimization threshold (e.g., a difference between a current placement score and new placement score, which placement scores may be determined, for example, according to the teachings of the '479 and '856 Applications, incorporated by reference above). For those resources with possible placements that would exceed the placement optimization threshold, migration operation scheduling 332 may place a migration operation for the partition in migration operation queue 336. In some embodiments, migration operation scheduling 332 may assign a priority to migration operations, so that more beneficial migration operations are performed sooner.

Migration operation scheduling 332 may also remove migration operations from queue 336, such as those migration operations identified as complete or failed. Those migration operations that have not yet been performed may have update priorities stored in the queue (e.g., raising or lowing the priority value). Time of last update may indicate when an update to the migration operation in the queue was last made. For example, a migration operation that has a later update time than other migration operations, may be considered to have more recent/relevant data. Priority values may be assigned to migration operations in order to schedule the migration operations opportunistically. In at least some embodiments, migration operation queue 336 may be implemented as a priority queue, and thus the highest priority migration operation may be selected for performance.

Migration worker(s) 340 may be implemented to perform migration operations. Migration worker(s) 340 may send a request to opportunistic placement manger 330 for a migration operation to perform. Opportunistic placement manger 330 may pull a migration operation from migration operation queue 336 and assign the migration operation to a migration worker 340 to direct. Alternatively, migration workers may directly access migration operation queue 336 to identify migration operations to perform, in some embodiments. Migration worker(s) 340 may, in some embodiments, update metadata for a migration operation in migration operation queue 336 (e.g., to change state from "ready" to "in progress").

In some embodiments, migration operation throttling 342 may be implemented to control the number of ongoing migration operations. Placement data collection 320 may track, maintain, or monitor current migration operations that are ongoing at resource host(s) 300, along with other data, such as network utilization, resource host utilization, or any other operational metrics and update volume/service state 322. Migration worker(s) 340 may access volume/service state 322 to determine whether a migration operation should be throttled according to some migration limit. For example, in some embodiments, network localities, which may include one or more resource host(s) 300, networking device (s), router(s), switches, power source(s), or other component or device of a virtual block-based storage service may be evaluated with respect to the effect of performing the identified resource migration operation. Different migration limits (e.g., number of migration operations, network utilization, resource host utilization, etc.) may be enforced with respect to the network localities. If the migration operation exceeds the limit for one of the different network localities, then the migration worker may throttle performance of the migration operation (e.g., the migration operation may be denied or delayed). In some embodiments, migration operation throttling may be limited to specific infrastructure zones or network localities (e.g., to the infrastructure zones or network localities which would be involved with perform a migration, such as zones that include the current and destination resource hosts of a migration operation). In some embodiments, opportunistic placement management 330 may perform migration operation throttling in addition to, or in place of migration worker(s) 340.

In various embodiments, migration worker 340 may request an updated placement for a volume that is to be migrated from placement engine 310, which may perform the various techniques discussed within the '479 and '856 Applications to provide a new placement location for the resource.

Figure 4:
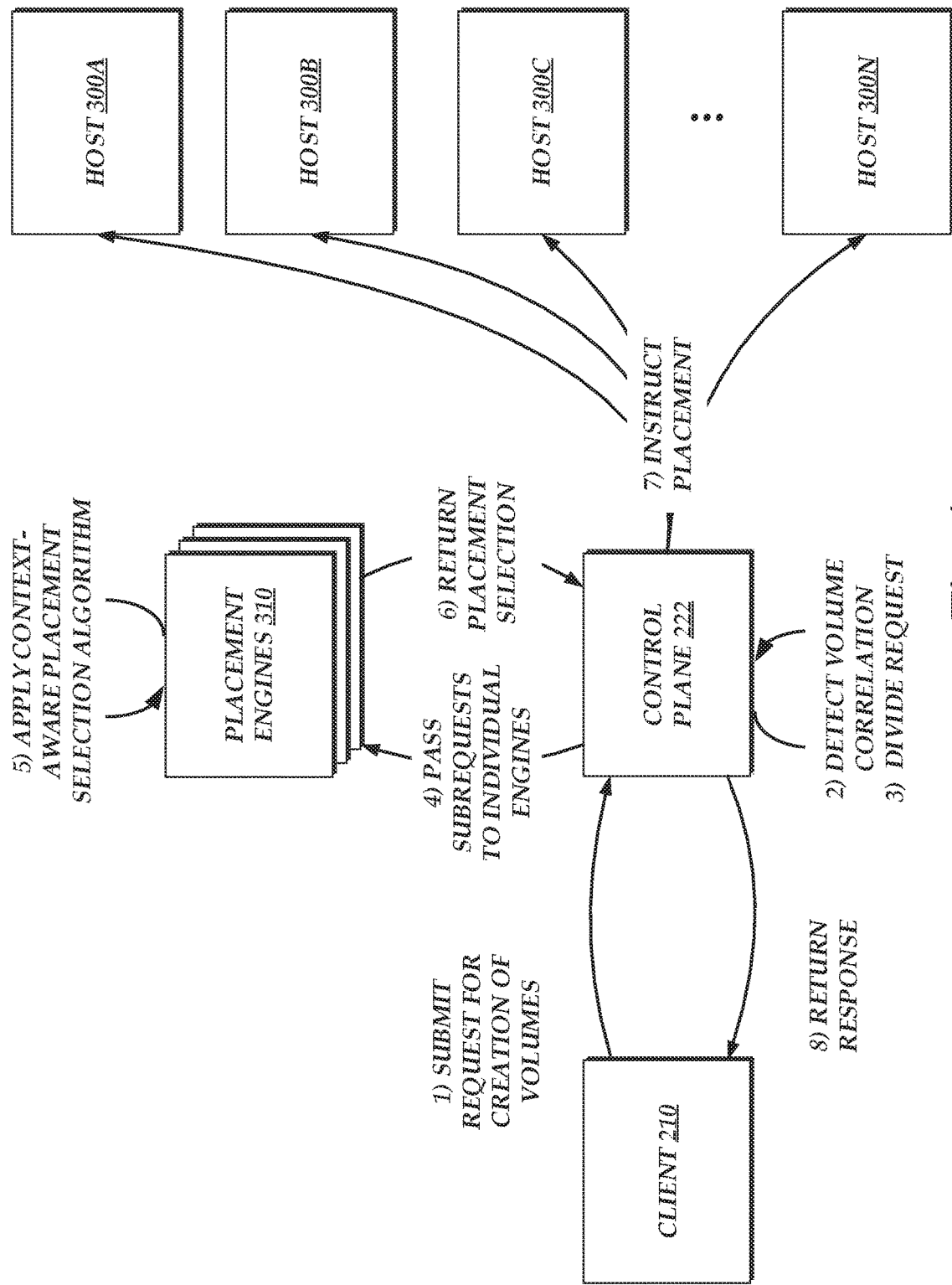
FIG. 4 is a logical block diagram depicting illustrative interactions for applying the context-aware host placement algorithm of FIG. 1 to a request for creation of correlated volumes.

FIG. 4 is a logical block diagram illustrating interactions for handling a request to create multiple volumes on the block storage service 220 of FIG. 2. The interactions begin at (1), where a client 210 submits a request for the creation of volumes, which is illustratively received at the control plane 222. At (2), the control plane 222 detects that the requested volumes are correlated. Illustratively, the control plane 222 may detect correlation when the volumes are requested by the same user, or associated with multiple computing devices within a cluster (e.g., on the virtual compute service 230). While FIG. 4 depicts interactions related to submission of a request to create multiple volumes, in some instances the control plane 222 may detect correlation between a one or more requested volumes and pre-existing volumes. For example, the control plane 222 may detect that requested volumes are being requested for attachment to a virtual computing device being added to an existing cluster of devices.

At (3), the control plane 222 divides the request into multiple sub-requests, in order to parallelize handling of the request among placement engines 310. Division may occur according to any of a variety of load balancing algorithms, a number of which are known in the art.

At (4), the control plane 222 passes the subrequests to individual placement engines 310 for handling. Thereafter, each placement engine 310 applies a context-aware placement selection algorithm, as disclosed herein, in order to identify a selection set of host devices onto which to place the volumes of the subrequest. As discussed above, the context-aware placement selection algorithm may include multiple stages, including but not limited to a filtering stage, a prioritization stage, and a selection stage where the selection set is selected (e.g., randomly) from among a candidate set whose size is determined based at least in part on a volume of the request submitted by the client 210. As will be appreciated by one of skill in the art, embodiments of the context-aware placement selection algorithm disclosed herein beneficially enable parallelization of the request among the placement engines 310 (as independently handled subrequests) while enabling prioritization of hosts (such that volumes are placed in desirable locations) and resulting in a probabilistic distribution of volumes among hosts of the candidate set.

In some instances, a client 210 may request for enough volumes that the block storage service 220 cannot service the request. In such an instance, one or more of the placement engines 310 may determine this result during implementation of the placement selection algorithm. For example, the engine 310 may determine a candidate size based on the number of volumes requested (among other criteria) at an early point in the algorithm (e.g., prior to a filtering stage of hosts). At any time during the algorithm, if a number of the evaluated hosts drop below the candidate set size, the engine 310 can determine that insufficient hosts exist on the service 220 to satisfy the request. The engine 310 may return this indication to the control plane 222, which in turn may notify the client 210. Note that this result may not indicate that there is an absolute lack of resources on the service 220 to satisfy the request. Rather, the result may indicate that fulfilling the request on the service 220 may result in undesirable packing of volumes on hosts 300, potentially leading to unacceptable performance for the volumes and/or other volumes stored on behalf of other users. Thus, rejection of a request may serve as a protection against degraded performance on the service 220. In some instances, when rejecting a request, the engine 310 may determine a maximum number of requests that could be serviced, by applying a filtering stage of the placement selection algorithm to determine a maximum number of hosts available to host volumes, and determining a requests size whose candidate size is equal to or less than that maximum number. The engine 310 can return this maximum number of requests to the control plane 222, which may transfer it to the client 210. Thus, the client 210 may be enabled to alter their request to a number of volumes that can be accommodated on the service 220.

For the purposes of illustration, the description of FIG. 4 will assume that the request is not rejected by the engines 310. Thus, at (6), each of the engines returns a placement selection to the control plane, indicating a set of hosts 300 onto which the engine 310 recommends placing the volumes of its subrequest. The control plane 222, at (7), can thus pass to each host 300 within the set of hosts 300 of each engine 310 instructions to create the requested volume. Creation of a volume may include, for example, allocating storage space of a host 300 to the volume, populating the volume with requested data (e.g., from another volume, from the other data storage services 240, etc.). While not shown in FIG. 4, each host 300 may notify the control plane 222 of whether volume creation was successful, and the control plane 222 may similarly notify the client 210.

As discussed above, one difficulty with management of distributed systems is the lack of perfect information available in the system. For example, multiple placement engines 310, when making a selection for placement of volumes, may select to place a volume on the same host. When numerous engines 310 make this selection, the number of correlated volumes on a host can increase to a point where performance on the host is significantly degraded. To address this problem, one embodiment of the present disclosure utilizes conditional placement on hosts 300. Specifically, on instructing a host 300 to place a volume, the control plane 222 may include criteria that the host 300 should apply. The criteria may include, for example, rejecting a placement request if the host 300 is already hosting more than n volumes related to a given multi-volume request. As the host 300 is in a better position than the engines 310 to have knowledge of its own local configuration, the use of placement conditions can reduce the likelihood of undesirable packing on the service 220. Example mechanisms for enforcing placement conditions at a host 300 are discussed in more detail in U.S. patent application Ser. No. 15/081,646, entitled "Preventing Concentrated Selection of Resource Hosts for Placing Resources" and filed Mar. 25, 2016, the entirety of which is hereby incorporated by reference. In some embodiments, where a host 300 rejects a placement request, the control plane 222 and/or a placement engine 310 may attempt to place the volume on another host 300, which may be repeated until a host 300 is located for the volume.

Thus, via the interactions of FIG. 4, a client 210 may be promptly notified if a request for creation of multiple volumes cannot be satisfied by the service 220. If the request can be satisfied, the requested volumes can be distributed among hosts 300 based on a context-aware placement algorithm, resulting in distribution of volumes among appropriate hosts 300 without requiring centralized decision making for that algorithm.

Figure 5:
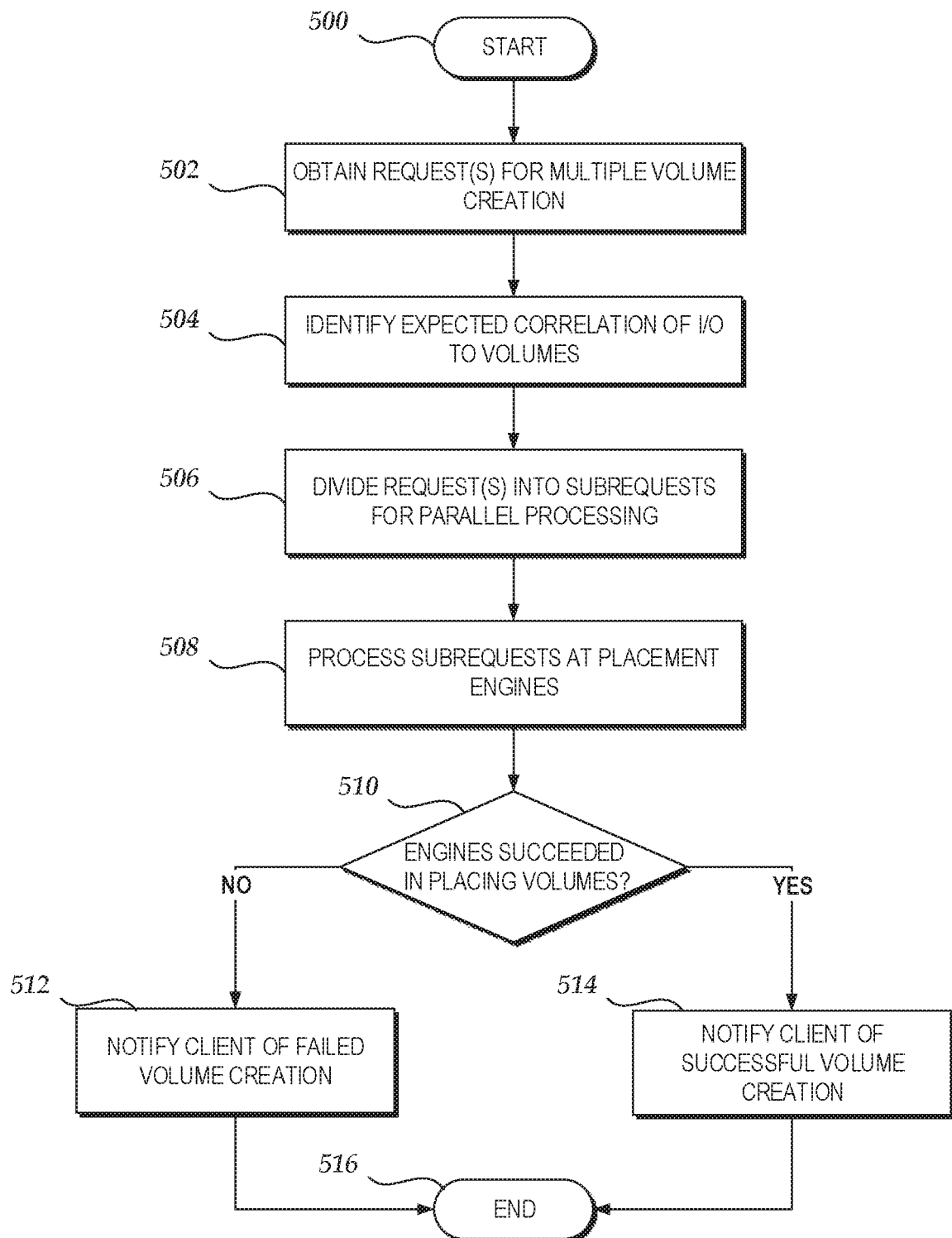
FIG. 5 depicts an illustrative routine that may be implemented by the block-based storage service of FIG. 2 to handle a request for creation of multiple volumes of the service utilizing distributed processing.
Figure 6:
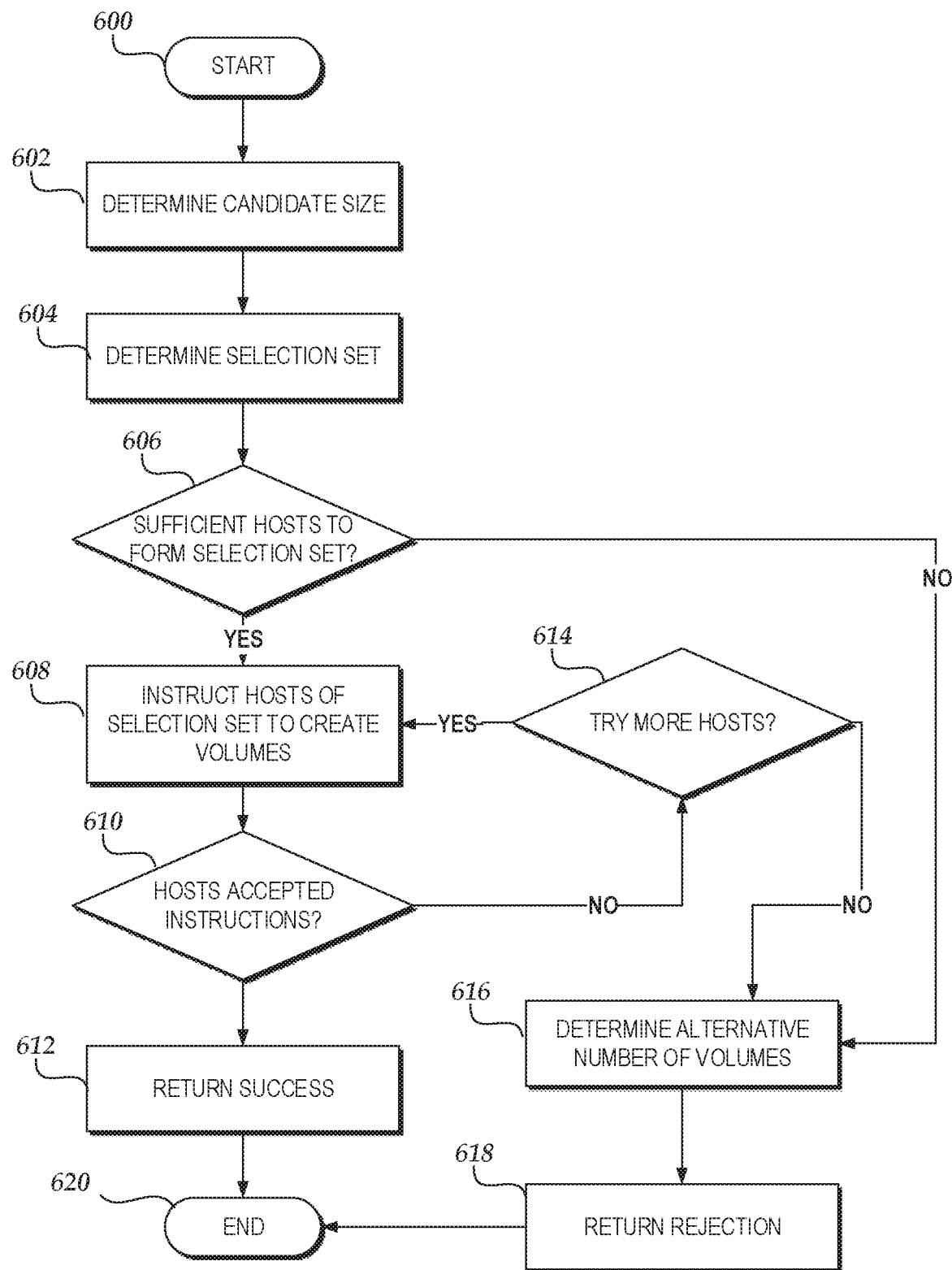
FIG. 6 depicts an illustrative routine that may be used by placement engines of the block-based storage service of FIG. 2 to implement the context-aware host placement algorithm of FIG. 1 in a distributed environment.

With reference to FIGS. 5 and 6, illustrative routines will be described for implementing a context-aware host placement algorithm on a block storage service. Specifically, FIG. 5 depicts an illustrative routine 500 for handling a request to create multiple volumes on a block storage service, by distributing the request to multiple placement engines for parallel processing, each engine implementing a context-aware host placement algorithm. FIG. 6 depicts an illustrative routine 600 for implementing a context-aware host placement algorithm on a placement engine. The routines 500 and 600 may be implemented, for example, by the block-based storage service 220. In one embodiment, the control plane 222 implements the routine 500, while individual placement engines 310 each implement the routine 600.

The routine 500 begins at block 502, where the control plane 222 receives one or more requests for creation of multiple data volumes on the block storage service 220. The request may be received, for example, from or due to activity of a client 210. For example, the client 210 may submit a request to create hundreds or thousands of virtual machine instances (e.g., to support a machine learning application or other distributed processing), each with a corresponding volume on the block storage service 220. In some instances, a single request may be received for creation of multiple volumes. In other instances, the volumes may be requested via multiple requests.

At block 504, the control plane 222 identifies an expected correlation of input/output operations (e.g., reads and writes) to the volumes as being correlated. In one embodiment, correlation is identified based on each of the volumes being associated with a given cluster of computing devices. For example, a request may indicate a cluster identifier for virtual machine instances to which the volumes will be attached, or may indicate that each volume will be attached to a machine within the same virtualized network space (e.g., a virtual local area network, or VLAN). In another embodiment, cluster identification may be based on each data volume be associated with a given client account. Cluster identification may further be based on timings of the requests. For example, multiple requests within a given time frame (e.g., 1 minute) and sharing another correlation factor (e.g., a common account, cluster identifier, etc.) may be identified as having an expected correlation.

In some embodiments, expected correlation may further be identified based on analysis of historical data. For example, the block storage service 220 may receive periodic requests to "spin-up" new data volumes related to a given account or cluster of devices, such as by a given user requesting the addition of 1,000 new data volumes each week. The service 220 may therefore determine whether use of the volumes is expected to be correlated based on historical analysis of similar requests. For example, if the 1,000 new volumes added each week by a customer have historically seen correlated loads, the control plane 222 may identify that a next request for 1,000 volumes will also see correlated loads. Similarly, if the 1,000 new volumes have not historically seen correlated loads, the control plane 222 may not identify a new request for 1,000 volumes as having expected correlated use, even if other factors for expected correlation are met (e.g., the volumes are attached to the same cluster of computing devices). The control plane 222 may handle uncorrelated requests for multiple volumes as independent requests, in some embodiments.

For the purposes of description of FIG. 5, it will be assumed that the control plane 222 identifies and expected correlation of use of the requested volumes. The routine 500 then proceeds to block 506, where the one or more requests are divided into subrequests for parallel processing on the service 220. Each subrequest may represent a request to place a subset of volumes within the multiple volumes identified as correlated in the routine 500. For example, a request to place 10,000 volumes may be divided into 10 subrequests, each to place 1,000 volumes. As discussed above, parallel processing of requests may facilitate rapid processing of requests, and particularly large requests (e.g., on the order of thousands, tens of thousands, etc.), by enabling placement for individual volumes to be distributed among multiple placement engines 310. Each subrequest may include contextual information regarding the multiple volumes requested, such as a total number of expected correlated volumes to be placed and a configuration of those volumes. In some instances, subrequests may further include additional contextual information. For example, where historical information is used to identify an expected correlation of use of volumes, each subrequest may indicate to a respective engine 310 an expected load on the correlated volumes, determined from the historical information.

At block 508, the control plane 222 utilizes multiple placement engines 310 to process the subrequests in a parallelized manner. An illustrative routine 600 that may be implemented at each placement engine 310 to process subrequests is described below with reference to FIG. 6. As discussed below, each placement engine 310 may attempt to place volumes corresponding to its subrequest, and notify the control plane 222 as to whether the volumes of subrequest have been successfully placed.

Thereafter, the routine 500 varies according to whether the engines have succeeded in placing the volumes. If each engine succeeds, the routine 500 proceeds to block 514, where the client 210 is notified of successful processing of their request or request. If an engine fails, the routine 500 proceeds to block 512, where the client 210 is notified that the request or request have failed. In some instances, the notification may include an alternative number of volumes that could be accommodated by the service 220, as may be determined by an engine 310 that returned a failure to place its subrequest. While not shown in FIG. 5, in some embodiments the routine 500 may include multiple iterations of block 508 prior to proceeding to block 512. For example, if a placement engine 310 returns a failure to place a subrequest, the control plane 222 may resubmit the request to either the same or a different engine 310. In one embodiment, the control plane 222 establishes a threshold for failures, such that if more than n subrequests result in failure, the routine 500 proceeds to block 512.

After returning success or failure, the routine 500 ends at block 516. As will be appreciated by one skilled in the art, the routine 500 therefore enables processing of requests to generate multiple volumes with expected correlated use, while providing a client 210 with a rapid determination as to whether the requests can or cannot be processed. Moreover, if the requests can be processed, placement can occur within the service 220 that avoids undesirable packing of correlated volumes on host devices while still enabling parallelized placement of volumes and without requiring that placement rely on perfect knowledge of a configuration of the service 220. Implementation of the routine 500 can therefore significantly improve operation of the service 220 in handling requests for correlated volumes.

As noted above, block 508 of routine 500 may be implemented in some embodiments by implementation of the routine 600 of FIG. 6 at each of a number of placement engines 310. As shown in FIG. 6, the routine 600 begins at block 602, where a placement engine 310 determines a candidate set size for placing volumes of a subrequest to be processed based on the routine 600. As discussed above, in one embodiment the candidate size can be based at least in part on a total number of expected correlated volumes (e.g., including those to be placed based on the processed subrequest and those of other parallelized subrequests). For example, the candidate size may be proportional to the total number of expected correlated volumes (e.g., as n % of the total number, where in may be for example in a range of between 50% and 200%). In some instances, the candidate set size may be further adjusted based on other factors, such as the expected accuracy of an engine 310's knowledge of a configuration of hosts 300. For example, where the engine 310 is expected to have less accurate knowledge (e.g., based on a staleness of information available to the engine 310, a high load of placement requests being handled, etc.), the candidate set size may be increased. Conversely, highly accurate knowledge may decrease the candidate set size. In another embodiment, expected utilization of volumes may modify candidate size. For example, where the requested volumes are associated with particular performance metrics (e.g., IOPS, bandwidth, latency, etc.), the candidate size may be varied according to those metrics, such as by increasing the candidate size for relatively high performance volumes (e.g., relative to average) and decreasing the candidate size for relatively low performance volumes. In some instances, predictions for performance may be set or altered based historical information. For example, a request for correlated high performance volumes may be treated (for the purposes of candidate set size) as a low performance volume if historical usage of similar volumes indicates low utilization of the volumes.

At block 604, the placement engine 310 determines a selection set for the volumes of the subrequest. Determination of a placement set may occur, for example, according to the algorithm of FIG. 1, such as by filtering hosts 300 of the service 220 to remove those unable to host a volume of the subrequest (e.g., due to insufficient resources, incompatible hardware, etc.), prioritizing those hosts able to host a volume, and selecting from the prioritized hosts a set on which to host the volumes (e.g., based on random or weighted random selection from among a top n prioritized hosts, where n is the candidate set size).

At block 606, the routine 600 varies according to whether sufficient hosts were available at block 604 to form the selection set. As discussed above, in some embodiments the service 220 may be unable to place volumes within a request while maintaining acceptable distribution of the volumes (e.g., to ensure acceptable performance of the volumes and volumes of other clients). As such, at any stage of determining the selection set in block 604, an engine 310 may determine that the volumes of the subrequest cannot be placed, because the candidate set size exceeds a number of available hosts 300 considered at that stage of determination.

If insufficient hosts 300 are available to create the selection set, the routine 600 proceeds to block 616, where the engine 310 determines an alternative number of volumes that the service is expected to be able to place. The engine 310 may determine the alternative number by inverting logic for determining candidate set size, such as by beginning with an number of hosts 300 believed to be available to host a volume (e.g., as determined at block 604) as the candidate set size, and determining a number of volumes that if requested results in that candidate set size. For example, if a subrequest of a request to generate 1,000 volumes failed due to that request requiring a candidate set size of 2,000 hosts (200% of the requested volumes) when only 1,500 hosts were available, the alternative number of volumes may be set at 750, because the candidate size for 750 volumes could then be determined to be 1,500 (200% of 750, and equal to the number of hosts believed to be available).

After determining the alternative number of volumes, the routine 600 then proceeds to block 618, where the engine 310 returns a rejection including the alternative number of volumes to the control plane 222. The control plane 222 may handle the rejection as noted above in FIG. 6, such as by retrying placement on an engine 310 or by notifying the client 210 that the request could not be successfully processed.

Returning to block 606, if there are sufficient hosts to form the selection set, the routine 600 proceeds to block 608, where the engine 310 instructs the hosts 300 of the selection set to host the volumes placed on the respective hosts 300 by the engine 310.

The routine 600 then varies according to whether the hosts 300 accepted the instructions. Hosts 300 may not accept instructions for a variety of reasons. For example, a host 300 may have failed in the period between the engine 310 last obtaining information regarding the host 300 and the instruction being sent to the host 300. In one embodiment, the instruction transmitted to each host 300 is conditional on a state of the host 300, such as the host not hosting more than n volumes within the correlated set. Conditional instructions may be beneficial, for example, when multiple engines 310 attempts to place different volumes of a correlated set of volumes on the same host 300.

If one or more hosts 300 did not accept the instructions, the routine 600 proceeds to block 614, where the engine 310 determines whether more hosts 300 should be attempted. If so, the routine 600 returns to block 608, where the engine 310 attempts to place the volumes not accepted by prior hosts 300 on one or more other hosts 300. The other hosts 300 may be selected, for example, from the candidate set identified at block 604 (e.g., a top n hosts from among prioritized hosts), in a similar selection manner as discussed above with respect to block 604 (e.g., random selection, weighted random selection, etc.). In one embodiment, an outcome of block 614 may depend on whether more hosts are available within the candidate set, and the engine 310 may determine not to try more hosts 300 when all hosts within the candidate set are ineligible to host a volume. Additionally or alternative, the outcome of block 614 may depend on a threshold failure rate set on the engine 310, such that n rejections of instructions to place a volume cause the engine 310 to cease trying to place a volume.

If at block 614 the engine determines not to try more hosts, the routine 600 proceeds to block 616, as described above. In this instance, the prioritized set size may be reduced based on a number of rejections from hosts 300 of instructions to host a volume. For example, each host 300 that rejected an instruction to host a volume may be removed from a prioritized list of available hosts, reducing a maximum candidate set size and thus reducing an alternative number of volumes determined at block 616.

Returning to block 610, after all hosts have accepted placement of volumes within the subrequest, the routine 600 proceeds to block 612, where the engine 310 notifies the control plane 222 of successful processing of the subrequest. The routine 600 then ends at block 620.

One of skill in the art will appreciate that various modifications to the routine 500 and 600 are possible. For example, while placement of volumes on hosts is described as a parallelized, in some embodiments only a single implementation of routine 600 may occur on a single placement engine 310. In some instances, the placement of hosts may additionally or alternatively occur in serial. For example, each of a set of distributed placement engines 310 may receive multiple subrequests from a single request in an iterative fashion. Moreover, while FIGS. 5 and 6 depict one possible division of functionality between a control plane 222 and placement engines 310, this division may vary across embodiments. For example, in one embodiment, a "filtering" placement engine may be provided to quickly determine whether a request for a number of data volumes can be fulfilled. The filtering placement engine may implement a portion of the routine 600, such as a version of the routine 600 omitting blocks 608, 610, and 614. The filtering placement engine may thus act to quickly determine whether a request can be placed, without actually attempting to place the request. In one embodiment, the control plane 222 may submit a request to the filtering placement engine to determine whether a request for data volumes can be serviced prior to dividing the request and distributing subrequests to fully functional engines. For example, the control plane 222 may submit a request to the filtering placement engine to determine whether a request for data volumes can be serviced between blocks 504 and 506 of the routine 500, enabling the control plane 222 to determine, prior to dividing a request into subrequests, whether the request is likely to fail. In some instances, the control plane 222 may implement the functionality of a filtering placement engine directly, without use of a placement engine. Still further, the ordering of blocks within the routines 500 and 600 may vary, and in some instances blocks may be omitted. For example, while the routine 600 describes determination of an alternative number of volumes at block 616, some embodiments may omit this determination, and simply notify a client of a failed request without also notifying the client of the alternate number. Thus, the routine 500 and 600 are intended as illustrative.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 7:
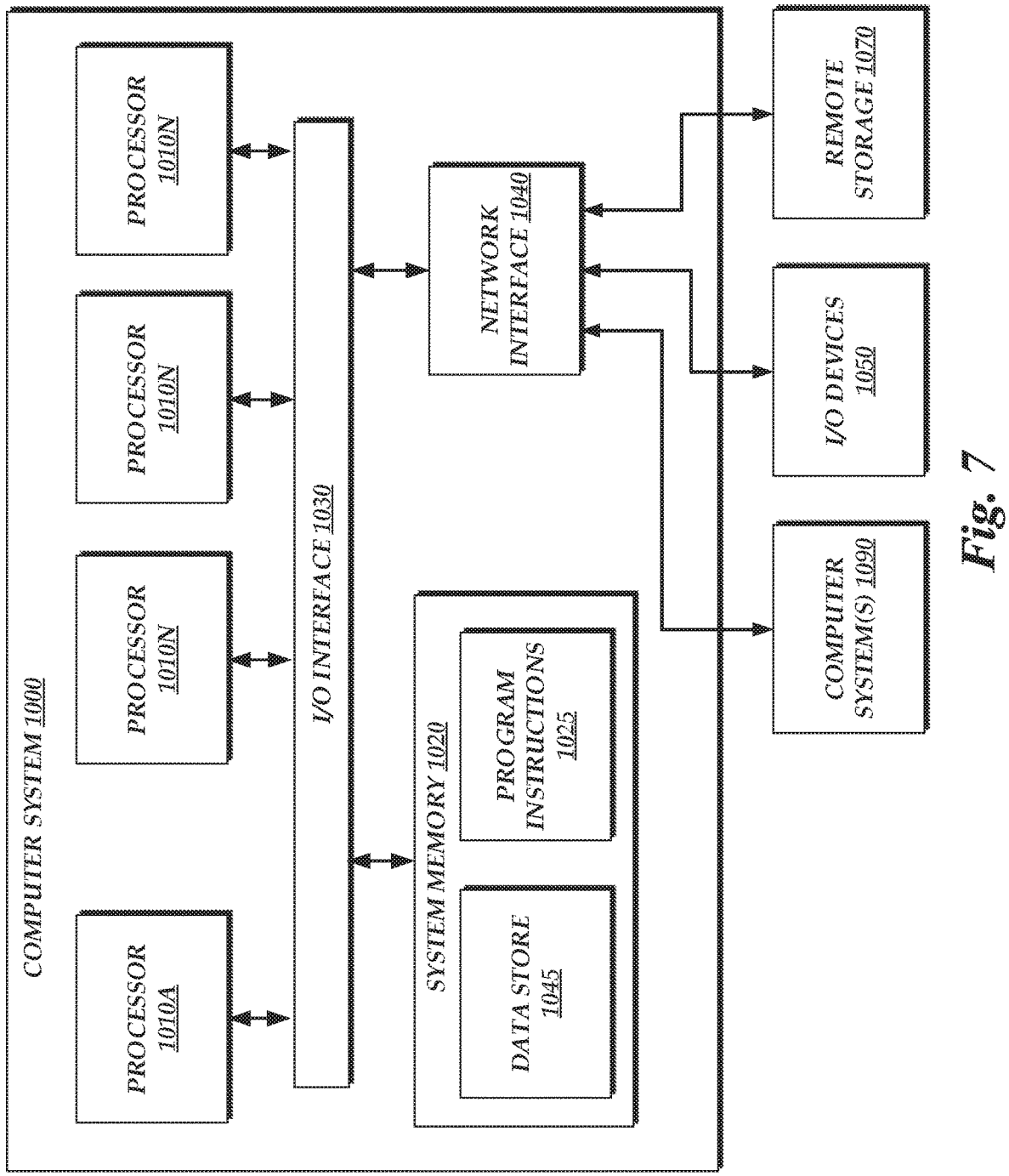
FIG. 7 is a block diagram illustrating an example computing system, according to some embodiments.

Embodiments of prioritizing resource hosts for resource placement as described herein may be executed on one or more computer systems, which may interact with various other devices. FIG. 7 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java byte-code, or in any other language such as C/C++, Java, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris, MacOS, Windows, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes and routines disclosed may begin in response to an event, such as on a predetermined or dynamically determined schedule, on demand when initiated by a user or system administer, or in response to some other event. When the process or routines are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process, routines, or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system to manage requests for multiple data volumes on a block-storage service, the system comprising:
   a plurality of hosts, each host corresponding to a computing device configured to host data volumes of the block-storage service, each data volume representing network-accessible block storage; and
   one or more computing devices configured to implement a control plane to:
      receive a request of a client computing device to create a plurality of data volumes on the service, each data volume of the plurality of data volumes representing an independent logical data volume that is configured to act as a virtualized storage disk for a client computing device;
      identify an expected correlation of input/output (I/O) operations to the plurality of data volumes;
      divide the request into a plurality of subrequests, each of the subrequests corresponding to a subset of data volumes from the plurality of data volumes; and
      distribute the plurality of subrequests among a plurality of placement engines;
   wherein the one or more computing devices are further configured to implement the plurality of placement engines, wherein to implement each placement engine, the one or more computing devices:
      obtain a subrequest, of the plurality of subreqeusts, that was distributed to the placement engine;
      determine, from at least a number of data volumes within the plurality of data volumes, a candidate set size indicating a number of hosts among which the subset of data volumes of the subrequest can be distributed to avoid or mitigate unacceptable performance of the block-storage service;

identify, from the plurality of hosts, a candidate set of hosts available to host the subset of data volumes of the subrequest, the candidate set at least equal in number to the candidate set size; and distribute, to a subset of hosts selected at least partly at random from within the candidate set, instructions to host individual data volumes from the subset of data volumes of the request.

2. The system of claim 1, wherein the subset of hosts is selected based at least in part on weighted random selection, each host of the subset being weighted based on a desirability of hosting a data volume of the subset of data volumes on the host.

3. The system of claim 2, wherein the desirability of hosting a data volume of the subset of data volumes on the host is based at least partly on at least one of a hardware configuration of the host, a network location of the host, or computing resource usage of the host.

4. The system of claim 1, wherein the instruction distributed to at least one host of the subset of hosts are instructions for the at least one host to host an individual data volume conditional on the at least one host not already hosting more than a threshold number of data volumes within the plurality of data volumes.

5. A computer-implemented method comprising:
receiving a request of a client computing device to create a plurality of data volumes on a on a block-storage service, each data volume of the plurality of data volumes representing an independent logical data volume that is configured to act as a virtualized storage disk for a client computing device;
identifying an expected correlation of operation of the plurality of data volumes;
dividing the request into a plurality of subrequests, each of the subrequests corresponding to a subset of data volumes from the plurality of data volumes;
distributing the plurality of subrequests among a plurality of placement engines; and
at individual placement engines of the plurality of placement engines:
obtaining a subrequest, of the plurality of subreqeusts, that was distributed to the individual placement engine;
determining, from at least a metric regarding the plurality of data volumes in aggregate, a candidate set size indicating a number of hosts among which the subset of data volumes of the subrequest are to be distributed;
identifying, from within a plurality of hosts configured to host data volumes of the block-storage service, a candidate set of hosts available to host the subset of data volumes of the subrequest, the candidate set at least equal in number to the candidate set size; and
distributing, to a subset of hosts selected at least partly at random from within the candidate set, instructions to host individual data volumes from the subset of data volumes of the request.

6. The computer-implemented method of claim 5, wherein identifying the expected correlation of operation of the plurality of volumes comprises identifying that the plurality of volumes are associated with a cluster of computing devices.

7. The computer-implemented method of claim 6, wherein the cluster of computing includes virtual computing devices on a hosted computing environment.

8. The computer-implemented method of claim 5, wherein identifying the expected correlation of operation of the plurality of volumes comprises identifying that the plurality of volumes are associated with an individual account on the block-storage service.

9. The computer-implemented method of claim 5, wherein the candidate set size is determined as a proportion of the number of data volumes within the plurality of data volumes.

10. The computer-implemented method of claim 5, wherein the placement engine maintains information indicating a state of the plurality of hosts, and wherein the candidate set size is further determined based at least partly on an expected accuracy of the information.

11. The computer-implemented method of claim 10, wherein the expected accuracy of the information is determined at least partly on a volume of placement requests received at the placement engine.

12. The computer-implemented method of claim 5, wherein the subset of hosts is selected from the candidate set based on random selection with replacement.

13. The computer-implemented method of claim 5, wherein the number of hosts among which the subset of data volumes of the subrequest are to be distributed is indicated based at least partly on a required capacity of the hosts to handle I/O operations.

14. A system comprising:
a data store including instructions executable to implement a placement engine; and
one or more computing devices configured to execute the instructions to implement the placement engine, wherein implementation of the placement engine causes the one or more computing devices to:
obtain a request to place one or more data volumes on a block-storage service, wherein the one or more data volumes are a subset of a plurality of data volumes that have an expected correlation of operation, and wherein each data volume of the plurality of data volumes represents an independent logical data volume that is configured to act as a virtualized storage disk for a client computing device;
determine, from at least a metric regarding the plurality of data volumes in aggregate, a candidate set size indicating a number of hosts among which the subset of data volumes of the request are to be distributed;
identify, from within a plurality of hosts configured to host data volumes of the block-storage service, a candidate set of hosts available to host the subset of data volumes of the request, the candidate set at least equal in number to the candidate set size; and
distribute, to a subset of hosts selected at least partly randomly from within the candidate set, instructions to host individual data volumes from the subset of data volumes of the request.

15. The system of claim 14, wherein the candidate set size is further determined based at least in part on a requested performance of the plurality of data volumes.

16. The system of claim 14, wherein implementation of the placement engine further causes the one or more computing devices to identify the expected correlation of operation of the plurality of volumes at least partly by identifying that the plurality of volumes are each requested to be populated with the same data.

17. The system of claim 14, wherein implementation of the placement engine further causes the one or more computing devices to identify the expected correlation of operation of the plurality of volumes at least partly by identifying that the request is associated with one or more historical requests to create a plurality of data volumes on the service that resulted in correlated operation on the service.

18. The system of claim 14, wherein the placement engine maintains information indicating a state of the plurality of hosts, and wherein the candidate set size is further determined based at least partly on an expected accuracy of the information.

19. The system of claim 14, wherein the subset of hosts is selected from the candidate set based on random selection without replacement.

20. The system of claim 14, wherein the instruction distributed to at least one host of the subset of hosts are instructions for the at least one host to host an individual data volume conditional on the at least one host not already hosting more than a threshold number of data volumes within the plurality of data volumes.

* * * * *

UNITED STATES PATENT AND TRADEMARK OFFICE
CERTIFICATE OF CORRECTION

PATENT NO. : 11,048,554 B1  
APPLICATION NO. : 16/366868  
DATED : June 29, 2021  
INVENTOR(S) : Brennan et al.

Page 1 of 1

It is certified that error appears in the above-identified patent and that said Letters Patent is hereby corrected as shown below:

In the Specification

In Column 18, Line 57, delete "sub-requests," and insert --subrequests,--.

In Column 28, Line 3, delete "operations. though" and insert --operations.--.

In the Claims

In Column 30, Line 62, Claim 1, delete "subreqeusts," and insert --subrequests,--.

In Column 31, Line 29, Claim 5, delete "on a on a" and insert --on a--.

In Column 31, Line 43, Claim 5, delete "subreqeusts," and insert --subrequests,--.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*